US012790413B2

(12) United States Patent
Bergstra et al.

(10) Patent No.: US 12,790,413 B2
(45) Date of Patent: Nov. 10, 2026

(54) PROPYLENE POLYMERIZATION PLANT AND PROPYLENE POLYMERIZATION PROCESS

(71) Applicant: BOREALIS AG, Vienna (AT)

(72) Inventors: Michiel Bergstra, Beringen (BE); Klaus Nyfors, Porvoo (FI); Claus Molin, Vienna (AT); Esa Kokko, Porvoo (FI)

(73) Assignee: BOREALIS AG, Vienna (AT)

( * ) Notice: Subject to any disclaimer, the term of this patent is extended or adjusted under 35 U.S.C. 154(b) by 594 days.

(21) Appl. No.: 18/252,464

(22) PCT Filed: Nov. 22, 2021

(86) PCT No.: PCT/EP2021/082469

§ 371 (c)(1),
(2) Date: May 10, 2023

(87) PCT Pub. No.: WO2022/112159

PCT Pub. Date: Jun. 2, 2022

(65) Prior Publication Data

US 2024/0010765 A1 Jan. 11, 2024

(30) Foreign Application Priority Data

Nov. 25, 2020 (EP) .................................... 20209881

(51) Int. Cl.
*C08F 10/06* (2006.01)
*B01J 19/00* (2006.01)
(Continued)

(52) U.S. Cl.
CPC ........... *C08F 10/06* (2013.01); *B01J 19/2435* (2013.01); *C08F 2/001* (2013.01); *C08F 2/01* (2013.01);
(Continued)

(58) Field of Classification Search
CPC .... C08F 2/01; C08F 2/001; C08F 2/34; C08F 10/06; B01J 19/2435; B01J 8/24
See application file for complete search history.

(56) References Cited

U.S. PATENT DOCUMENTS

| | | | | |
|---|---|---|---|---|
| 5,684,097 A * | 11/1997 | Palmroos | B01J 19/2435 | 526/64 |
| 6,919,892 B1 * | 7/2005 | Cheiky | G06T 13/40 | 348/E5.022 |

(Continued)

FOREIGN PATENT DOCUMENTS

| | | |
|---|---|---|
| CN | 101942051 B * | 11/2012 |
| CN | 207685181 U | 8/2018 |

(Continued)

OTHER PUBLICATIONS

Korean Application No. 10-2023-7019510, Decision to Grant dated Jul. 28, 2025.

(Continued)

*Primary Examiner* — Rip A Lee
(74) *Attorney, Agent, or Firm* — Tarolli, Sundheim, Covell & Tummino LLP

(57) ABSTRACT

Loop-Loop-gas-phase reactor polypropylene plant and process for producing polypropylene and polypropylene copolymers.

10 Claims, 3 Drawing Sheets

Figure 1:
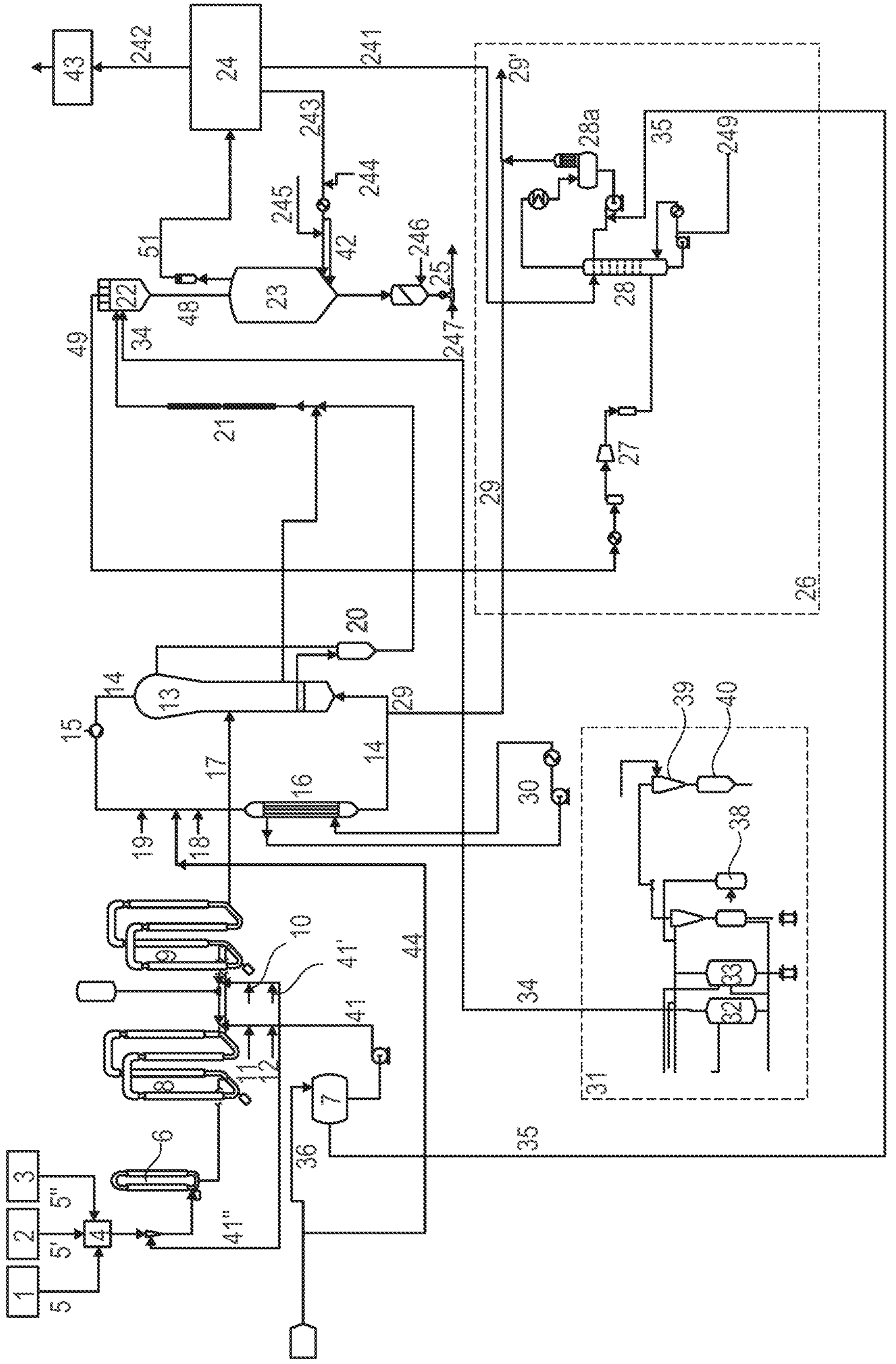

(51) Int. Cl.

| | |
|---|---|
| ***B01J 19/24*** | (2006.01) |
| ***C08F 2/00*** | (2006.01) |
| ***C08F 2/01*** | (2006.01) |
| ***C08F 210/06*** | (2006.01) |
| *B01J 8/24* | (2006.01) |

(52) U.S. Cl.

CPC .......... *B01J 8/24* (2013.01); *B01J 2219/0006* (2013.01); *C08F 210/06* (2013.01)

(56) References Cited

U.S. PATENT DOCUMENTS

| | | | | |
|---|---|---|---|---|
| 8,188,198 | B2 * | 5/2012 | Van Der Schrick | F22B 1/16 422/138 |
| 8,492,489 | B2 * | 7/2013 | Fouarge | C08F 2/01 526/64 |
| 9,310,137 | B2 * | 4/2016 | Odi | B01J 19/1862 |
| 9,340,629 | B2 * | 5/2016 | Bhandarkar | C08F 10/02 |
| 10,544,245 | B1 * | 1/2020 | Vantomme | C08F 210/16 |
| 10,549,251 | B2 * | 2/2020 | Schwerdtfeger | B01J 19/245 |
| 10,646,845 | B2 * | 5/2020 | Bhandarkar | C08F 110/02 |
| 10,787,528 | B2 * | 9/2020 | Reichelt | C08J 5/18 |
| 10,822,435 | B2 * | 11/2020 | Banat | B01J 19/242 |
| 2005/0272891 | A1 * | 12/2005 | Fouarge | G05D 11/132 526/170 |
| 2009/0023872 | A1 | 1/2009 | Smith | |
| 2023/0416416 | A1 * | 12/2023 | Bergstra | B01J 19/2435 |

FOREIGN PATENT DOCUMENTS

| | | | |
|---|---|---|---|
| EP | 0887379 | A1 | 12/1998 |
| EP | 3438133 | A1 | 2/2019 |
| JP | 2001-522904 | A | 11/2001 |
| JP | 2002535455 | A | 10/2002 |
| JP | 2002544333 | A | 12/2002 |
| KR | 20030045647 | A | 10/2009 |
| WO | 1998/058975 | A1 | 12/1998 |
| WO | 1999/025741 | A1 | 5/1999 |
| WO | 2019/089111 | A1 | 5/2019 |
| WO | 2019/090883 | A1 | 5/2019 |

OTHER PUBLICATIONS

European Application No. 20209881.0, Extended Search Report dated Jun. 17, 2021.

Taiwanese Application No. 110143372, Office Action dated Jun. 28, 2022.

Japanese Application No. 2023-528123, Office Action dated Jul. 2, 2024.

Indian Application No. 202317039681, Office Action dated Jul. 6, 2026.

* cited by examiner

PROPYLENE POLYMERIZATION PLANT AND PROPYLENE POLYMERIZATION PROCESS

FIELD OF THE INVENTION

The present invention concerns a polymerization plant suitable for extra large-scale propylene polymerization. The present invention further concerns a process for polymerization of propylene using such plant.

BACKGROUND

Coupling of loop and gas phase reactor is known for more than two decades under the trademark Borstar® and has found its way into practically any textbook in the field of polyolefins. The basic process layout is for example described in WO9858975A1 dealing with the preparation of propylene homopolymers and copolymers, which comprises polymerizing propylene optionally with comonomers in the presence of a catalyst at elevated temperature and pressure in at least one slurry reactor and at least one gas phase reactor, the polymerization product of at least one slurry reactor, containing unreacted monomers, being directly conducted to a first gas phase reactor essentially without recycling of the unreacted monomers to the slurry reactor.

One important aspect of loop-gas-phase reactor configurations is once-through conversion. For example, early WO9925741 describes a method of introducing polymer slurry obtained from a slurry reactor into a gas phase reactor containing a fluidized bed (C, D) with a first fluidized zone (C) on top of a second fluidized zone (D) with said fluidized zones having different flow patterns, in order to optimize the once-through conversion of the process.

Unfortunately medium size polypropylene production plants have significant higher operational costs and fixed costs per ton of produced product when compared to extra-large size polypropylene plants. However, by increasing the scale of the production, quality issues and operational issues can do rise. Increasing capacity of loop reactors can be done by adding further legs to the reactor. In industry, loop reactors have been scaled up from two legs to six legs, and even 8 legs loop reactors are not uncommon. However, the single circulation time using an 8-leg loop reactor will be roughly doubled when compared to a 4-legs loop reactor. Unfortunately, such modifications may result in drawbacks; e.g., significant concentration gradients can occur. For example, in polypropylene homo-polymerization the hydrogen to propylene ratio can vary over the length of the loop reactor, and especially in random propylene ethylene copolymerization the ratio of ethylene to propylene can cause a significant gradient in the loop reactor. It goes without saying, when the C2/C3 ratio drops over the length of the HLZ:SC loop reactor, the randomness will be affected. Thus, when producing for example random propylene ethylene copolymer workarounds such as local fed of ethylene or multiple feed points to the reactor become a must. To sum up, upscaling of loop reactors is extremely cumbersome.

Another challenge for polymerization processes at very high throughput and especially for very large scale gas phase reactors is to control the temperature in a wide operating range, e.g. also at turndown ratios of 50%, and to establish a broad operation window, e.g. broad temperature ranges. Turndown ratio characterizes the ability to run a plant at reduced throughput. Turndown ratio is usually defined as [1−(minimum capacity/design capacity)].

In case of turndown, the cooling water return (CWR) flow temperature can increase to high temperatures outside the normal operating window of cooling water systems. Reduced efficiency and corrosion cracking problems in the context of stainless steel equipment can be expected. Avoiding unnecessary high temperatures in the cooling water return flow is particularly important as chlorine is added to cool water circuits and/or towers for preventing biological growth.

Thus, there remains still the need for a process and a plant allowing upscaling to extra-large scale avoiding at least in part these and related problems.

SUMMARY OF THE INVENTION

The present invention provides a plant for preparing propylene homopolymers or propylene copolymers, comprising (i) feed tank(s) for catalyst (1), optional co-catalyst (2), optional activator and/or optional external donor (3);
(ii) optional a pre-contacting unit (4) for catalyst mixing being connected by feed lines (5, 5', 5'') with the feed tank(s);
(iii) a prepolymerization reactor (6) connected with the feed tank(s) (1, 2, 3) or the pre-contacting unit (4);
(iv) a propylene feed tank (7);
(v) a first loop reactor (8) connected with the prepolymerization reactor;
(vi) a second loop reactor (9) connected with the first loop reactor via a loop reactors connecting line (10);
(vii) means for feeding monomer and optional comonomer (11) and hydrogen (12) to one or more of first loop reactor (8), second loop reactor (9), and/or loop reactors connecting line (10) between the loop reactors;
(viii) a gas-phase reactor (13) equipped with a gas circulation line (14), a circulation gas compressor (15) and a circulation gas cooler (16), the gas-phase reactor being coupled to the at least second loop reactor (9) by a direct feed line (17);
(ix) means for feeding liquid propylene monomer (44) and/or comonomer (18) and/or hydrogen (19) to the gas-phase reactor (13); whereby preferably the means for feeding monomer and/or comonomer are suitable for feeding monomer and/or comonomer in condensed form;
(x) optionally a product discharge vessel (20) connected with the gas-phase reactor; optionally a product outlet heater (21) (*xi*)
(xii) a product receiver tank (22) connected with the optional product discharge vessel (20) or with the gas-phase reactor (13);
(xiii) at least one purge bin (23);
(xiv) at least one propylene nitrogen recovery unit (24);
(xv) a column supply line (241) for feeding a hydrocarbon stream to a column (28)
(xvi) a nitrogen re-feed line (243) for re-feeding a nitrogen rich stream to the purge bin (23)
(xvii) optionally a thermal oxidizer unit (43)
(xviii) an exhaust line (242) for discharge of an exhaust stream optionally to the optional thermal oxidizer (43)
(xix) outlet line (for propylene powder) with means for propylene homopolymer or propylene copolymer recovery (25) optionally including means for homogenization, additivation, and pelletization;
(xx) a recovery gas treating unit (26) comprising at least one gas recovery compressor (27), said column (28) and a reflux recovery feed vessel (**28*a*), the reflux recovery feed vessel (28***a*) being connected via a recovery feed line (29) with the gas circulation line (14) of the gas-phase reactor (13)

(xxi) a cooling circuit (30) for the circulation gas cooler (16);

(xxii) a blow down unit (31) comprising a high pressure blow down bin (32), a low pressure blow down bin (33), the blow down unit (31) being optionally connected via connecting line (34) with the product receiver tank (22);

(xxiii) a recovery feed line (35) connecting recovery gas treating unit (26) with the propylene feed tank (7), and wherein the circulation gas cooler (16) is a heat exchanger within a closed loop cooling water system comprising a cooling water pump (301), a secondary heat exchanger (302), expansion vessel (303) and a by-pass (304) over a secondary heat exchanger.

The present invention further provides a process for preparing propylene homopolymers and copolymers, comprising a) providing catalyst, optional co-catalyst, optional activator and/or optional external donor in feed tanks (1, 2, 3);

b) feeding said catalyst, said optional co-catalyst, said optional activator and/or said optional external donor to a pre-contacting unit (4) for providing a mixed catalyst system; feeding said mixed catalyst system to the prepolymerization reactor (6) or feeding said catalyst, said optional co-catalyst, said optional activator and/or said optional external donor directly to a prepolymerization reactor (6);

c) initiating prepolymerization by introducing propylene monomer and optionally introducing comonomer thereby providing a prepolymer;

d) feeding said prepolymer to a first loop reactor (8) and polymerizing propylene optionally with comonomer yielding a first intermediate;

e) feeding the first intermediate to a second loop reactor (9) via a loop reactors connection line (10) and further polymerizing propylene optionally with comonomer yielding a second intermediate, whereby propylene is fed from propylene feed tank (7) via propylene feed line (41) to the first loop reactor (8) and the second loop reactor (9);

f) introducing optional comonomer and/or hydrogen at further feed points to the loop reactors;

g) feeding the second intermediate containing unreacted monomer(s) directly to gas-phase reactor (13) via direct feed line (17);

h) further polymerizing propylene and optional comonomer in said gas-phase reactor (13) by feeding propylene monomer and/or comonomer and/or hydrogen by effecting a gas circulation via a gas circulation line (14) in upwards direction through the gas-phase reactor (13), whereby the circulating gas is cooled in a circulation gas cooler (16);

i) discharging the gas-phase reactor product into an optional product discharge vessel (20) and subsequently into a product-receiver tank (22) via an optional product outlet heater (21) for providing a raw mixture or discharging the gas-phase reactor product directly into a product receiver tank (22) for providing a raw mixture;

j) feeding said raw mixture to purge bin (23);

k) purging said raw mixture by nitrogen and catalyst deactivation agent, the catalyst deactivation agent being preferably steam, l) separating nitrogen, deactivation agent and hydrocarbons from the purge bin (23) in a propylene nitrogen recovery unit (24) thereby providing an essentially pure nitrogen steam being fed via nitrogen re-feed line (243) to purge bin (23);

providing a hydrocarbon lean waste stream being fed via exhaust line (242) to an optional thermal oxidizer unit (43);

providing a dry hydrocarbon rich stream being fed via column supply line (241) to column (28), whereby said column (28) is operated at a pressure higher than the pressure of the gas-phase reactor (13) for removing oligomers, waxes and oils;

m) redirecting part of the non-condensed propylene back to the gas-phase reactor via a recovery line (29) and/or the condensed propylene to the propylene feed tank (7) via a recovery line (35) and/or part of the condensed propylene is fed to a propylene propane splitter, whereby preferably, inert lights can be purged from said part of the non-condensed propylene and can be directed to a furnace or stream producing unit, and wherein the circulation gas cooler (16) is a heat exchanger within a closed loop cooling water system comprising a cooling water pump (301), a secondary heat exchanger (302), expansion vessel (303) and a by-pass (304) over the secondary heat exchanger.

The plant according to the present invention, in contrast to conventional Borstar plants, contains a recovery feed line (29) allowing to redirect non-condensed propylene back to the gas-phase reactor (13). This setup surprisingly turned out to be beneficial with respect to the overall conversion and even further with respect to the monomer factor. For example, when producing random polypropylene copolymer huge savings are observed.

In the process according to the present invention, column (28) is operated at a pressure higher than the pressure of the gas-phase reactor (13). This enables to recycle part of the hydrocarbons via recovery lines (29, 29') back to the gas-phase reactor (13). It surprisingly turned out, that high hydrogen concentrations in the presence of ethylene are possible and the process is characterized by a high once-through conversion. As another surprising aspect, high amount of hydrogen recovery was observed. This is particularly beneficial for high melt flow rate grades: the required fresh hydrogen for the gas phase reactor can be lowered.

In a further aspect, nitrogen, steam and propylene as obtained are separated into a dry hydrocarbon rich stream (N2 lean <0.5 mol %) which is fed back to column (28), a pure nitrogen (>99 mol %) stream which is fed back to purge bin (23) via nitrogen re-feed line (243); and a water waste flow and hydrocarbon lean nitrogen flow, which is fed to thermal oxidizer unit (43).

The plant according to the present invention is configured such that the circulation gas cooler (16) is a heat exchanger within a closed loop cooling water system comprising a cooling water pump (301), a secondary heat exchanger (302), expansion vessel (303) and a by-pass (304) over the secondary heat exchanger. In the inventive plant and process, the gas circulation flow is cooled by a heat exchanger in order to have a very efficient temperature control in the gas phase reactor, usually and preferably a fluidized bed reactor. The polymerization heat is preferably transferred to a closed loop cooling water system, comprising a cooling water pump (301), a secondary heat exchanger (302), expansion vessel (303) and a by-pass (304) over the secondary heat exchanger. The polymerization heat is further transferred via the closed loop cooling water system to a common site cooling water system, which can be for example cooling water towers. The main advantage is that the cooling water flow through the primary heat exchanger can be kept constant at a temperature above the dew point of the circulation gas and offering a wide operating window on production rates in the gas phase reactor. Turndown ratios of 50% or more become possible. Turndown ratio characterizes the ability to run a plant at reduced throughput. Turndown ratio is defined as [1−(minimum capacity/design capacity)].

In case of using a direct cooling water system cool water return temperature would rise to high values above typical designed operating temperature of the common site cooling water system, i.e. the operating window had to be limited.

The plant according to the present invention preferably comprises one or more of the following:

(i) knock out drum (38)

(ii) gas phase reactor area depressurization cyclone (39)

(iii) gas phase reactor flare knock out drum (40).

Such units increase the safety of the inventive plant.

In the process according to the present invention, the circulation gas cooler (16) is a heat exchanger and the heat is transferred to a closed loop cooling water system, comprising a cooling water pump (301), a secondary heat exchanger (302), expansion vessel (303) and a by-pass (304) over the secondary heat exchanger. More preferably, the polymerization heat is transferred via the closed loop cooling water system to a common site cooling water system, such as a cooling water tower, for enabling a constant cooling water flow through the heat exchanger within the gas circulation at a temperature above the dew point of the circulation gas.

In a further aspect, the process according to the present invention is characterized by possible turn down ratios of more than 50%. This high turn down allows really high flexibility with respect to varying products and demands.

The split, i.e. the ratio of the amounts of material produced in loop and gas phase reactors respectively ranges from 40-60 to 60-40.

In yet a further aspect, the polymerization temperature in the first and/or the second loop reactor, preferably in both loop reactors is below 72° C., more preferably below 70° C.

DETAILED DESCRIPTION

In the following, the invention shall be described with respect to the figures.

REFERENCE NUMBERING FOR FIG. 1

1 feed tank for catalyst
2 feed tank for co-catalyst
3 feed tank(s) for activator and/or optional external donor
4 pre-contacting unit for catalyst mixing
5,5', 5" feed lines connecting feed tank connecting feed tanks and catalyst feed vessel or prepolymerization reactor
6 prepolymerization reactor
7 propylene feed tank
8 first loop reactor
9 second loop reactor
10 loop reactors connecting line
11 means for feeding monomer and comonomer
12 means for feeding hydrogen
13 gas-phase reactor
14 gas circulation line
15 circulation gas compressor
16 circulation gas cooler
17 direct feed line
18 means for feeding comonomer
19 means for feeding hydrogen
20 product discharge vessel
21 product outlet heater
22 product receiver tank
23 purge bin
24 propylene nitrogen recovery unit
25 outlet line (for polymer powder) with means for propylene homopolymer or propylene copolymer recovery (optionally including means for homogenization, additivation and pelletization;
26 recovery gas treating unit
27 gas recovery compressor
28 column
28*a* reflux recovery feed vessel
29, 29' recovery feed lines
30 cooling circuit for circulation gas cooler
31 blow down unit
32 high pressure blow down bin
33 low pressure blow down bin
34 connecting line
35 recovery feed line
36 further feed line optionally containing dryer(s)
38 knock out drum
39 gas phase reactor area depressurization cyclone
40 gas phase reactor flare knock out drum
41, 41', 41" propylene feed line
42 means for catalyst deactivation (e.g. means for introducing low pressure steam)
43 thermal oxidizer unit
44 means for feeding liquid propylene monomer
48 purge bin feed line
49 line connecting product receiver tank (22) and gas recovery compressor (27)
51 feed line from purge bin (23) to propylene nitrogen recovery unit (24)
241 column supply line
242 exhaust line
243 nitrogen re-feed line
244 external nitrogen feed line
245 feed line for catalyst deactivating agent (usually low pressure steam)
246 further nitrogen feed line
247 line for conveying nitrogen
249 outlet line for oligomers FIG. 1 shows the inventive plant which is used for carrying out the inventive process.

Figure 2:
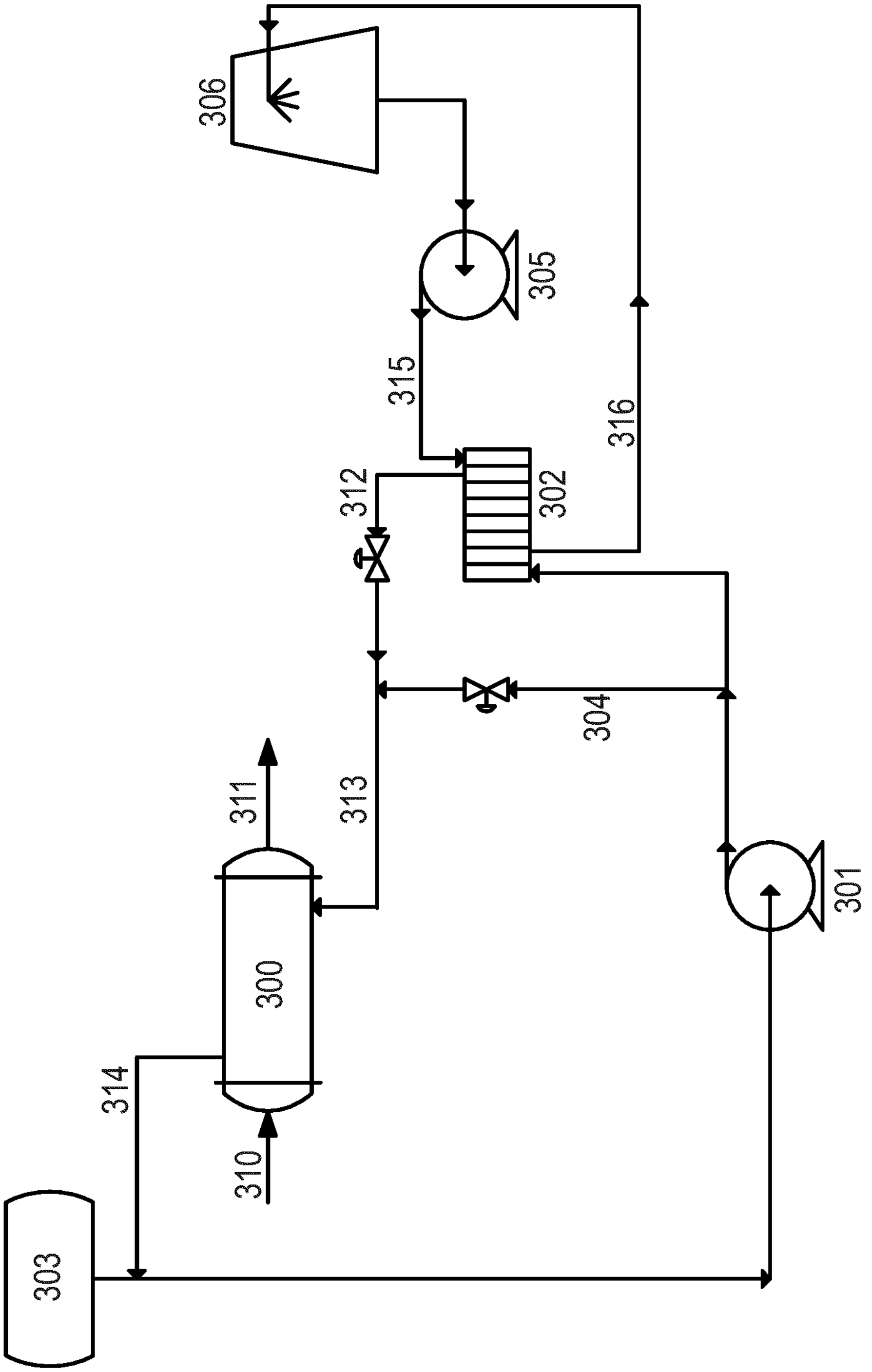

FIG. 2 shows the inventive cooling setup.

REFERENCE NUMBERING FOR FIG. 2

300 gas phase reactor circulation gas cooler
301 cooling water pump of closed loop cooling water system
302 a secondary heat exchanger
303 expansion vessel of closed loop cooling water system
304 by-pass over the secondary heat exchanger
305 site cooling water pump(s)
306 site cooling water tower(s)
310 gas circulation flow to the gas phase reactor
311 gas circulation flow after compression stage from the gas phase reactor
312 closed loop cooled cooling water flow
313 total closed loop cooling water flow in to gas phase reactor circulation cooler

314 closed loop cooling water flow out from gas phase reactor circulation cooler

315 site cooling water supply flow

316 site cooling water return flow

Figure 3:
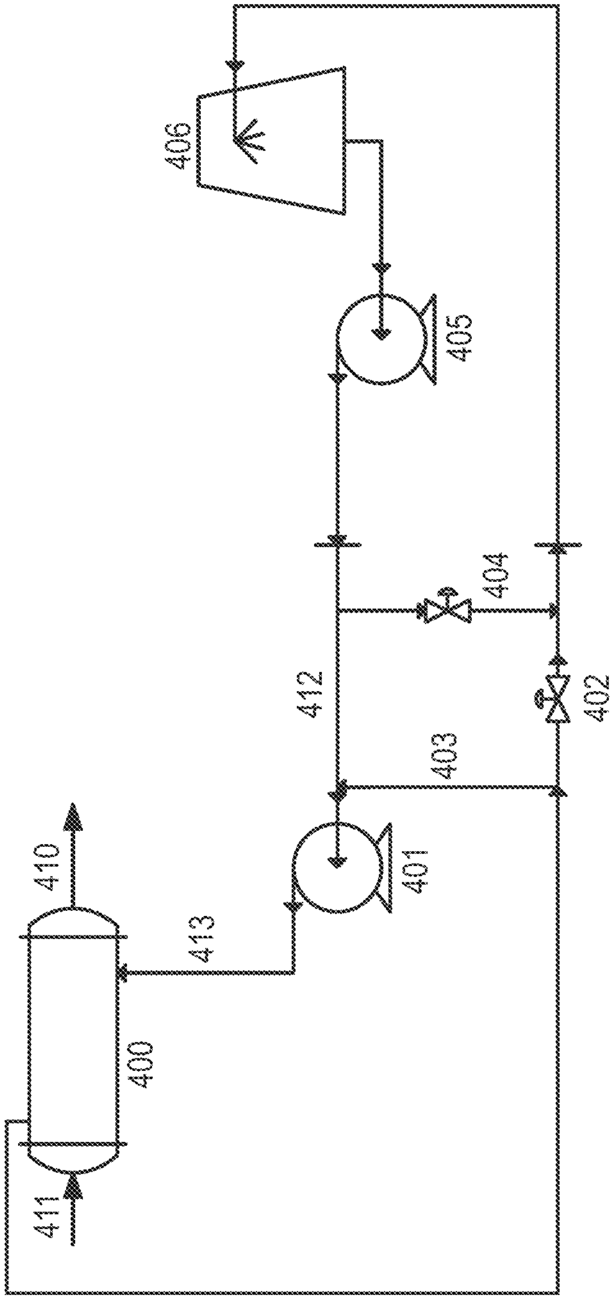

FIG. 3 shows a comparative cooling water setup.

REFERENCE NUMBERING FOR FIG. 3

400 gas phase reactor circulation gas cooler

401 cooling water pump of gas phase reactor cooling system

402 cooling water return control line

403 cooling water by-pass

404 cooling water supply control line

405 site cooling water pump(s)

406 site cooling water tower(s)

410 gas circulation flow to the gas phase reactor

411 gas circulation flow after compression stage from the gas phase reactor

412 fresh cool water supply flow

413 total cooling water flow to gas phase reactor circulation gas cooler

The plant according to the present invention shall be further described with respect to FIG. 1.

The plant according to the present invention for preparing propylene homopolymers and copolymers comprises feed tank(s) for catalyst (1), optional co-catalyst (2), optional activator and/or optional external donor (3). Optionally there is a pre-contacting unit (4) for catalyst mixing being connected by feed lines (5, 5', 5") with the feed tank(s). In various embodiments and for various catalyst systems, a pre-contacting tank is not necessary.

The plant according to the present invention also includes a prepolymerization reactor (6) connected with the feed tank(s) (1, 2, 3) or the pre-contacting unit (4). Such prepolymerization is known in the art. The plant also includes a propylene feed tank (7), a first loop reactor (8) connected with the prepolymerization reactor, and a second loop reactor (9) connected with the first loop reactor via a loop reactors connecting line (10) as well as means for feeding comonomer (11) and hydrogen (12) to one or more of first loop reactor (8), second loop reactor (9), and/or loop reactors connecting line (10) between the loop reactors.

Such setup is frequently found in existing plants.

Apart from the loop reactors the plant according to the present invention also comprises a gas-phase reactor (13) equipped with a gas circulation line (14), a circulation gas compressor (15) and a circulation gas cooler (16), the gas-phase reactor being coupled to the at least second loop reactor (9) by a direct feed line (17), means for feeding liquid propylene monomer (44) and/or comonomer (18) and/or hydrogen (19) to the gas-phase reactor (13). In addition to the plant optionally includes a product discharge vessel (20) connected with the gas-phase reactor. Such product discharge vessel contributes to the operational stability. Optionally a product outlet heater (21) is present. Usually a product outlet heater will be several units. The plant according to the present invention also includes a product receiver tank (22) connected with the optional product discharge vessel (20) or with the gas-phase reactor (13), at least one purge bin (23).

In addition to that, the plant also includes at least one propylene nitrogen recovery unit (24) with a column supply line (241) for feeding a hydrocarbon stream to a column (28), a nitrogen re-feed line (243) for re-feeding a nitrogen rich stream to the purge bin (23), optionally a thermal oxidizer unit (43) and an exhaust line (242) for discharge of an exhaust stream optionally to the optional thermal oxidizer unit (43). Optionally there can be further feed lines such as a nitrogen re-feed line (243), an external nitrogen feed line (244), a feed line (245) for catalyst deactivating agents, i.e. usually low pressure steam. Preferably, there is also an outlet line (249) for oligomers.

The plant according to the present invention also includes an outlet line (for polymer powder) with means for propylene homopolymer or propylene copolymer recovery (25) said means (25) optionally including means for homogenization, additivation, and pelletization, a recovery gas treating unit (26) comprising at least one gas recovery compressor (27), said column (28) and a reflux recovery feed vessel (28*a*), the reflux recovery feed vessel (28*a*) being connected via a recovery feed line (29) with the gas circulation line (14) of the gas-phase reactor (13).

In addition to that, there is a cooling circuit (30) for the circulation gas cooler (16). Such circulation gas cooler (16) contributes to the broad operational window.

Apart therefrom there is also a blow down unit (31) comprising a high pressure blow down bin (32), a low pressure blow down bin (33), the blow down unit (31) being optionally connected via connecting line (34) with the product receiver tank (22).

The plant according to the present invention further includes a recovery feed line (35) connecting recovery gas treating unit (26) with the propylene feed tank (7). This important recovery feed line (35) allows refeed of propylene also to the loop reactors, i.e. results in an integrated recovery system.

The cooling setup according to the present invention shall be described with reference to FIG. 2. The cooling medium, usually water, is circulated by a cooling water pump (301) in the closed loop cooling water system. The water enters a secondary heat exchanger (302) in which the heat is transferred to the site cooling water circuit. The site cooling water circuit includes site cooling water tower(s) (306), site cooling water pump(s) (305) but may also include heat consumers, i.e. re-use of the heat for residential heating or similar. The secondary heat exchanger can be of any type such as plate, shell and tube.

For properly adjusting temperature and keeping the flow through the primary heat exchanger constant, there is also a by-pass (304) over the secondary heat exchanger in the closed loop cooling water system. In this closed loop cooling water system, heat is transferred from gas to water in the gas phase reactor circulation gas cooler (300). As known in the art there is also a expansion vessel (303) of the closed loop cooling water system.

A direct heat exchanger on site cooling water system with recirculation pump is shown in FIG. 3. Such configuration has been used for comparative purposes and is not desirable. It can be seen the site cooling water circuit is coupled directly with the gas phase reactor circulation gas cooler (400).

Experimental Part

The plant and the process according to the invention have been exemplified in the following examples. These examples are included for illustrative purposes and do not limit the invention.

Examples 1 and 2

In REF1 and REF2, no gas circulation cooler was used and there was only one loop reactor. In example IE1 a gas phase reactor and a gas circulation cooler was used. In example IE2, the recirculation was lowered.

TABLE 1

| | | REF1 | REF2 | IE1 | IE2 |
|---|---|---|---|---|---|
| | | Preparation of random polypropylene ethylene copolymer | | | |
| | | | | inventive plant/inventive process | |
| | | | | | product discharge vessel |
| Prepolymerization reactor | | | | | |
| production | kg/h | 0.9 | 0.9 | 0.9 | 0.9 |
| | Bar | 56 | 56 | 39 | 39 |
| T | ° C. | 20 | 20 | 20 | 20 |
| (first) Loop reactor | | | | | |
| production | kg/h | 45 | 90 | 60 | 60 |
| P | Bar | 55 | 55 | 38 | 38 |
| T | ° C. | 85 | 85 | 70 | 70 |
| Second loop reactor | | | | | |
| production | ton/h | | | 30 | 30 |
| P | Bar | | | 37 | 37 |
| T | ° C. | | | 70 | 70 |
| GPR1 | | | | | |
| production | kg/h | 30 | 90 | 90 | 90 |
| P | Bar | 35 | 21 | 21 | 21 |
| T | ° C. | 85 | 85 | 85 | 85 |
| Recirculation | kg/h | 15 | 45 | 45 | 21 |
| once-through conversion | | 83% | 80% | 80% | 90% |

It can be seen that the inventive plant and the inventive process simultaneously allowed high production in the gas phase reactor and high once-through conversion.

Example 3

In a second experimental evaluation, the catalyst mileage (IE1 versus REF2) was assessed.

TABLE 2

| | Catalyst | Loop Reactor | | Gas Phase Reactor | | |
|---|---|---|---|---|---|---|
| | feed normalised [%] | residence time [h] | production normalised [%] | residence time [h] | production normalised [%] | catalyst productivity [—] |
| IE1 two loops + GPR | 100 | 0.8 | 100 | 2 | 100 | 2 |
| REF2 one loop + GPR | 100 | 0.5 | 80 | 2 | 80 | 1.6 |

Surprisingly a high catalyst mileage was obtained for the inventive process:

Example 4

In yet a further experimental evaluation using the inventive plant and the inventive process, the cooling water temperatures were monitored when producing random ethylene propylene copolymer. The inventive used a closed loop cooling water system as shown in FIG. 2, whereas the comparative examples used a configuration as shown in FIG. 3.

The results are shown in Table 3 provided below.

| | Ref# | | Inventive examples | | | | | | | | | | | | | | |
|---|---|---|---|---|---|---|---|---|---|---|---|---|---|---|---|---|---|
| | | | normal ran-dom | 40/60 ran-dom | 50/50 ran-dom | 60/40 ran-dom | turn down ran-dom | 45/55 ran-dom | 50/50 ran-dom | 60/40 ran-dom | 40/60 ran-dom | 50/50 homo | 40/60 homo | 60/40 homo | 50/50 homo | 40/60 homo | 60/40 homo |
| production in the GPR | | kg/h | 99 | 108 | 90 | 72 | 45 | 99 | 90 | 72 | 108 | 90 | 108 | 72 | 90 | 108 | 72 |
| Temperature in GPR | | ° C. | 80 | 80 | 80 | 80 | 80 | 90 | 90 | 90 | 90 | 80 | 80 | 80 | 90 | 90 | 90 |
| T CRG in | 310 | ° C. | 82.8 | 82.8 | 82.8 | 82.8 | 84.0 | 92.6 | 92.6 | 92.6 | 92.6 | 82.8 | 82.8 | 82.8 | 92.6 | 92.6 | 92.6 |
| T CRG out | 311 | ° C. | 54.6 | 52.4 | 57.2 | 62.5 | 70.6 | 64.1 | 66.9 | 72.3 | 64.5 | 57.8 | 52.7 | 63.0 | 67.5 | 62.2 | 72.8 |

-continued

| | | | | | | | | | | | | | | | | | |
|---|---|---|---|---|---|---|---|---|---|---|---|---|---|---|---|---|---|
| by pass flow | 304 | m3/h | 2.7 | 0.0 | 3.9 | 4.8 | 5.4 | 4.2 | 4.6 | 5.1 | 3.9 | 4.0 | 0.6 | 4.9 | 4.7 | 3.8 | 5.2 |
| Flow of T controlled stream | 312 | m3/h | 3.3 | 6.0 | 2.1 | 1.2 | 0.6 | 1.8 | 1.4 | 0.9 | 2.2 | 2.0 | 5.4 | 1.1 | 1.3 | 2.2 | 0.8 |
| Temperature of control stream | 312 | ° C. | 34.6 | 38.3 | 31.3 | 28.0 | 27.0 | 30.5 | 28.9 | 27.3 | 32.2 | 30.7 | 38.0 | 27.8 | 28.6 | 32.2 | 27.3 |
| T CLCW in | 313 | ° C. | 41.9 | 38.3 | 45.9 | 53.7 | 65.1 | 51.8 | 55.7 | 63.7 | 49.7 | 46.7 | 39.1 | 54.4 | 56.6 | 48.9 | 64.4 |
| T CLCW out | 314 | ° C. | 50.9 | 48.2 | 53.9 | 60.1 | 69.1 | 60.7 | 63.7 | 70.0 | 59.5 | 54.6 | 48.7 | 60.6 | 64.4 | 58.4 | 70.5 |
| T CWS | 315 | ° C. | 27 | 26.5 | 27 | 27 | 27 | 27 | 27 | 27 | 27 | 27 | 27 | 27 | 27 | 27 | 27 |
| T CWR | 316 | ° C. | 35.0 | 35.2 | 34.2 | 32.6 | 30.6 | 34.9 | 34.1 | 32.6 | 35.7 | 34.0 | 35.5 | 32.5 | 33.9 | 35.5 | 32.4 |
| CWS flow | 315 | m3/h | 6.8 | 6.8 | 6.8 | 6.8 | 6.8 | 6.8 | 6.8 | 6.8 | 6.8 | 6.8 | 6.8 | 6.8 | 6.8 | 6.8 | 6.8 |

| | | | Comparative examples | | | | | | | | | | | | | | |
|---|---|---|---|---|---|---|---|---|---|---|---|---|---|---|---|---|---|
| product | | | normal random | 40/60 random | 50/50 random | 60/40 random | turn down random | 45/55 random | 50/50 random | 60/40 random | 40/60 random | 50/50 homo | 40/60 homo | 60/40 homo | 50/50 homo | 40/60 homo | 60/40 homo |
| production in the GPR | | kg/h | 99 | 108 | 90 | 72 | 45 | 99 | 90 | 72 | 108 | 90 | 108 | 72 | 90 | 108 | 72 |
| Temperature GPR | | ° C. | 80 | 80 | 80 | 80 | 80 | 90 | 90 | 90 | 90 | 80 | 80 | 80 | 90 | 90 | 90 |
| T CRG in | 410 | ° C. | 82.77 | 82.77 | 82.77 | 82.77 | 84 | 92.56 | 92.56 | 92.56 | 92.56 | 82.77 | 82.77 | 82.77 | 92.56 | 92.56 | 92.56 |
| T CRG out | 411 | ° C. | 54.55 | 52.37 | 57.17 | 62.49 | 70.56 | 64.14 | 66.85 | 72.32 | 64.45 | 57.76 | 52.66 | 62.97 | 67.45 | 62.16 | 72.8 |
| by pass flow | 403 | m3/h | 1.6 | 0.0 | 3.0 | 4.5 | 5.3 | 3.6 | 4.2 | 4.9 | 3.0 | 3.3 | 0.0 | 4.6 | 4.3 | 3.0 | 5.0 |
| Fresh cool water flow | 412 | m3/h | 4.4 | 6.0 | 3.0 | 1.5 | 0.7 | 2.4 | 1.8 | 1.1 | 3.0 | 2.7 | 6.0 | 1.4 | 1.7 | 3.0 | 1.0 |
| T CWS | 412 | ° C. | 27 | 25 | 27 | 27 | 27 | 27 | 27 | 27 | 27 | 27 | 26.5 | 27 | 27 | 27 | 27 |
| T CW in | 413 | ° C. | 30.2 | 25.4 | 35.3 | 45.5 | 59.8 | 40.1 | 45.3 | 55.6 | 36.8 | 36.4 | 26.5 | 46.4 | 46.4 | 36.4 | 56.5 |
| T CW out | 414 | ° C. | 39.2 | 35.2 | 43.4 | 51.8 | 63.8 | 49.0 | 53.3 | 61.8 | 46.6 | 44.3 | 36.1 | 52.6 | 54.2 | 45.9 | 62.6 |

As can be seen from above Table 3 the temperature of the cooling water return (T CWR) stayed below 36° C. for all inventive examples. Thus, a surprisingly broad operating window was found. For the comparative examples, the temperature of the cooling water out, abbreviated T CW out went up to values above 50° C. and in some cases even above 60° C. Thus, many constraints are given for operation. It is needless to say temperature of above 50° C. or even above 60° C. cannot be accepted due to massive piping and heat exchanger restrictions.

The invention claimed is:

1. A plant for preparing a propylene homopolymer or a propylene copolymer, comprising:

(i) feed tank(s) for catalyst, optional co-catalyst, optional activator and/or optional external donor;

(ii) an optional pre-contacting unit for catalyst mixing which is connected by feed lines with the feed tank(s);

(iii) a prepolymerization reactor connected with the feed tank(s) or the optional pre-contacting unit;

(iv) a propylene feed tank;

(v) a first loop reactor connected with the prepolymerization reactor;

(vi) a second loop reactor connected with the first loop reactor via a loop reactors connecting line;

(vii) a means for feeding monomer and optional comonomer and hydrogen to one or more of the first loop reactor, the second loop reactor, and/or the loop reactors connecting line between the loop reactors;

(viii) a gas-phase reactor equipped with a gas circulation line, a circulation gas compressor and a circulation gas cooler, the gas-phase reactor is coupled to the second loop reactor by a direct feed line;

(ix) a means for feeding monomer and/or comonomer and/or hydrogen to the gas-phase reactor;

(x) an optional product discharge vessel connected with the gas-phase reactor;

(xi) an optional product outlet heater;

(xii) a product receiver tank connected with the optional product discharge vessel or with the gas-phase reactor;

(xiii) at least one purge bin;

(xiv) at least one propylene nitrogen recovery unit;

(xv) a column supply line for feeding a hydrocarbon stream to a column;

(xvi) a nitrogen re-feed line for re-feeding a nitrogen rich stream to the purge bin;

(xvii) an optional thermal oxidizer unit (xviii) an exhaust line for discharge of an exhaust stream optionally to the optional thermal oxidizer unit;

(xix) a means for propylene homopolymer or propylene copolymer recovery, optionally including means for homogenization, additivation, and pelletization;

(xx) a recovery gas treating unit comprising at least one gas recovery compressor, said column and a reflux recovery feed vessel, the reflux recovery feed vessel is connected via a recovery feed line with the gas circulation line of the gas-phase reactor;

(xxi) a cooling circuit for the circulation gas cooler;

(xxii) a blow down unit comprising a high pressure blow down bin, a low pressure blow down bin, the blow down unit is optionally connected via a connecting line with the product receiver tank;

(xxiii) a recovery feed line connecting the recovery gas treating unit with the propylene feed tank, and wherein the circulation gas cooler is a heat exchanger within a closed loop cooling water system comprising a cooling water pump, a secondary heat exchanger, an expansion vessel and a by-pass over a secondary heat exchanger.

2. The plant of claim 1, further comprising one or more of the following:

(xxiv) a knock out drum;

(xxv) a gas phase reactor area depressurization cyclone; or (xxvi) a gas phase reactor flare knock out drum.

3. A process for preparing a propylene homopolymer or a propylene copolymer comprising:

a) providing catalyst, optional co-catalyst, optional activator and/or optional external donor in feed tanks;

b) feeding said catalyst, said optional co-catalyst, said optional activator and/or said optional external donor to a pre-contacting unit for providing a mixed catalyst system; feeding said mixed catalyst system to a prepolymerization reactor, or feeding said catalyst, said optional co-catalyst, said optional activator and/or said optional external donor to a prepolymerization reactor;

c) initiating prepolymerization by introducing propylene monomer and optionally introducing comonomer thereby providing a prepolymer;

d) feeding said prepolymer to a first loop reactor and polymerizing propylene optionally with comonomer yielding a first intermediate;

e) feeding the first intermediate to a second loop reactor via a loop reactors connection line and further polymerizing propylene optionally with comonomer yielding a second intermediate, whereby propylene is fed from a propylene feed tank via a propylene feed line to the second loop reactor;

f) introducing comonomer and/or hydrogen at further feed points to the loop reactors;

g) feeding the second intermediate containing unreacted monomer(s) directly to gas-phase reactor via a direct feed line;

h) further polymerizing propylene and optional comonomer in said gas-phase reactor by feeding propylene and/or comonomer and/or hydrogen and by effecting gas circulation via a gas circulation line in an upward direction, whereby a circulation gas is cooled in a circulation gas cooler;

i) optionally discharging a gas-phase reactor product into an optional product discharge vessel and subsequently into a product receiver tank via a connecting line for providing a raw mixture or discharging a gas-phase reactor product directly into a product receiver tank for providing a raw mixture;

j) feeding said raw mixture to a purge bin;

k) purging said raw mixture with nitrogen and a catalyst deactivation agent, and obtaining the propylene homopolymer or the propylene copolymer, l) Separating nitrogen, deactivation agent and hydrocarbons from the purge bin in a propylene nitrogen recovery unit thereby providing an essentially pure nitrogen steam which is fed via a nitrogen re-feed line to the purge bin;

providing a hydrocarbon lean waste stream which is fed via an exhaust line to a thermal oxidizer unit;

providing a dry hydrocarbon rich stream which is fed via a column supply line to a column, whereby said column is operated at a pressure higher than a pressure of the gas-phase reactor for removing oligomers, waxes and oils;

m) redirecting condensed propylene and propane to one or more of the following:

said propylene feed tank via a recovery feed line;

an optional propane/propylene splitter, and feeding a non-condensed matter at least in part to the gas-phase reactor via a recovery feed line; and wherein the circulation gas cooler is a heat exchanger and heat is transferred via a closed loop cooling water system comprising a cooling water pump, a secondary heat exchanger, an expansion vessel and a by-pass over the secondary heat exchanger.

4. The process of claim 3, wherein polymerization heat is transferred via the closed loop cooling water system to a common site cooling water system or a cooling water tower for enabling a constant cooling water flow through the heat exchanger within the gas circulation at a temperature above a dew point of the circulation gas.

5. The process of claim 3, wherein a turn down ratio is more than 50% as to production rate in the gas-phase reactor.

6. The process according to claim 3, the wherein a polymerization temperature in the first and/or the second loop reactor is below 72° C.

7. The process according to claim 3, further comprising producing a homopolymer with a split between 40% and 60% produced in the loop and gas-phase reactors, respectively.

8. The process according to claim 3, further comprising producing a random ethylene propylene co-polymer with a split between 40% and 60% produced in the loop and gas-phase reactors, respectively.

9. The process according to claim 3, wherein a polymerization temperature in the gas-phase reactor is between 80° C. and 90° C. and a pressure is between 19 and 25 barg.

10. The process according to claim 3, wherein an operating pressure of the column is 26 barg.

* * * * *